Jan. 18, 1927.

S. A. SLAUSON

TAKE-UP DEVICE

Filed April 28, 1924

1,615,145

Inventor:
Stephen A. Slauson
By: Wm O. Belt
Atty.

Patented Jan. 18, 1927.

1,615,145

UNITED STATES PATENT OFFICE.

STEPHEN A. SLAUSON, OF CEDAR RAPIDS, IOWA, ASSIGNOR, BY DIRECT AND MESNE ASSIGNMENTS, TO VEC PRODUCTS COMPANY, OF CEDAR RAPIDS, IOWA, A CORPORATION OF IOWA.

TAKE-UP DEVICE.

Application filed April 28, 1924. Serial No. 709,551.

My invention relates to take-up devices and finds utility wherever it is desired to use a bolt with a nut which will be automatically adjusted to take up any wear and to keep the bolt tight. It finds particular utility in a bearing as in the connection of a connecting rod of an automobile to the crank shaft.

One of the principal objects of my invention is to provide a take-up device which will take up no more room than a standard device of the same character, thus permitting use thereof wherever standard devices are used.

Another important object is to provide a nut which will give a quick adjustment upon turning, whereby it is possible to use a double thread on nut and bolt of extra depth, thereby giving twice the wearing surface which is possible with a single thread; and which nut is also capable of a fine adjustment. All similar devices known to me employ a single thread.

Another important object is to provide a take-up nut which may be used on a bolt of standard size throughout its length instead of its being necessary to reduce the size of the bolt at its threaded end, as is common in devices of this character now in use.

Another and important object is to provide a take-up device comprising a main nut, a lock nut and a coiled spring under tension between the two nuts, all keyed together with the spring under proper tension and ready for installation, thus insuring that the spring is properly tensioned.

Another object is to provide a take-up device employing a coiled spring, of such construction that the spring will at no time come in contact with the threads of the bolt on which the device is employed, or with the crank case of a motor in which the device may be employed.

Another object is to provide a key which can be used to tension the spring used with the locking device and then hold the parts of the device in proper position with the spring under tension, whereby the device may be applied as a unit, and which will not block or close any of the castellations or openings in the lock nut.

Another object is to provide a take-up device for use with bolts employed with a split bearing and used on opposite sides of the bearing, of such a character that as the device on one side tightens or loosens, that on the other will loosen or tighten respectively, thereby insuring a constant holding power in the bearing.

Another object is to provide a safety take-up device using a coiled spring, but which can not become displaced if the spring should become displaced.

Referring now to the drawing forming a part of this specification:—

Figure 1:
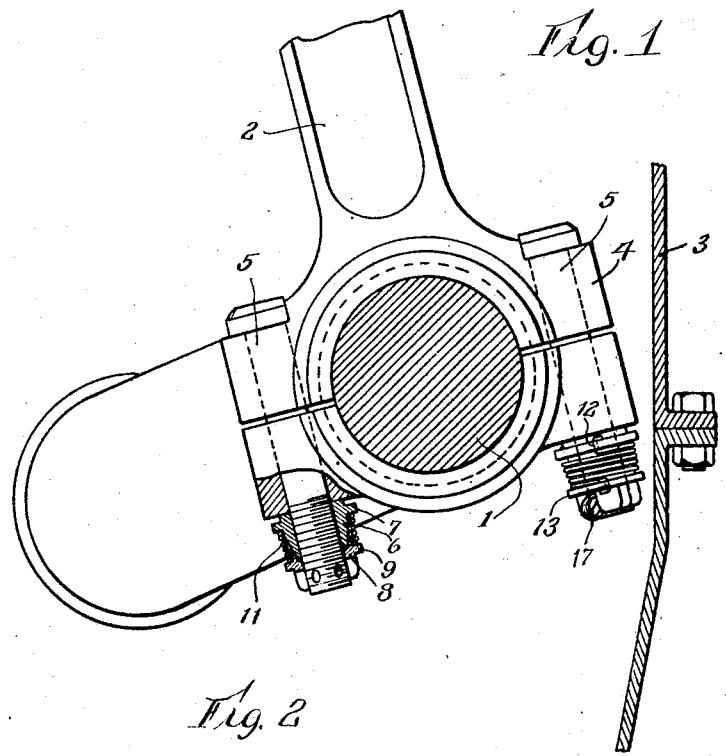
Fig. 1 is an elevation of a split bearing employing my improved take-up device.
Figure 2:
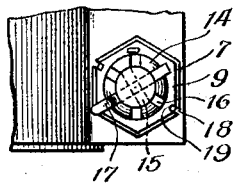
Fig. 2 is a bottom plan view of one of the devices in Fig. 1 in place.

In Fig. 1 I have shown a crank shaft 1 of an automobile engine to which is operatively connected the connecting rod 2, all operating within the crank casing 3. The connecting rod is attached to the crank shaft 1 by means of the split bearing 4 of usual type, the parts of the bearing being connected together by means of bolts 5. I have chosen this example of a location in which my improved take-up device may be used as one in which it is of especial value, but it is to be understood that I contemplate use of my device in any other location to which it is adapted.

In the construction shown in Fig. 1, it is well-known in the art that trouble has been experienced in fastening the bolts 5 in such a way as to take up wear in the bearing and to keep the bolts tight at all times. Various devices have been proposed and tried to lock the nuts on the ends of the bolts, but these have been open to various objections, one of which is that they employ a torsion spring coming in contact with the thread of the bolt and it has been difficult to provide a device which will not take up more room than the standard nut for which the clearance between crank casing and nut is designed.

I provide a take-up device in the form of a solid conical main nut 6 provided with a flange 7. Surrounding the end of this conical nut is a lock nut 8 acting also as an anchor nut and provided with a flange 9 and rib 10 fitting the conical surface of the main nut 6. Surrounding the main nut 6 and the rib 10 is a conical tension spring 11 secured at 12 to the main nut, and at 13 to the lock nut and tending to turn the main nut to tighten it on the bolt 5. The lock nut is provided with a plurality of castellations 14, in this case six in number, and the end of the bolt is provided with a plurality of intersecting passageways 15, in this case two in number. The passageways 16 between the castellations 14 are adapted to register with the passageways 15 in the bolt to permit insertion of the cotter pin or other locking device 17, and by this arrangement I permit adjustment of the lock nut by one-twelfth of a turn, as will be evident. I prefer to make my main nut and lock nut of standard hexagonal form and at opposite corners thereof I provide slots 18 and 19 to receive the legs 20 of key 21.

As shown, key 21 is a forked construction and the legs 20 are provided of such a span as to engage in slots 18 of the main nut and are offset at 22 to engage in slots 19 of the lock nut. Each leg 20 is further provided with a curved recess 23 adapted to engage the sides of the slots 18 and thus hold the key in position. The opposite end of the key 21 is provided with projections 24 spaced apart a sufficient distance so that this end of the key forms a spanner to engage the passageways 16 in the castellated nut to tension it.

Figure 3:
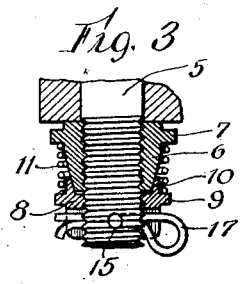
Fig. 3 is a longitudinal section of my improved device.
Figure 4:
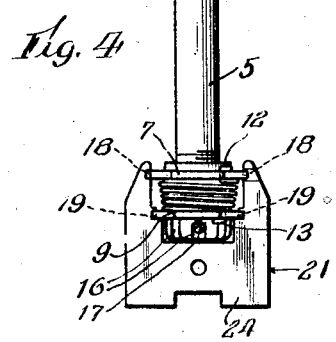
Fig. 4 is an elevation of my device with the key in position thereon after the device has been placed in position on a bolt.
Figure 5:
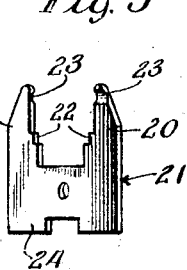
Fig. 5 is a perspective view of the key which I employ with my device.

In operation, the nuts 6 and 8 are placed in telescoping relation, as shown in Fig. 3, the inner surface of the rib 10 tightly engaging the surface of the conical nut 6. The torsion spring is placed in position and connected to the two nuts, and then by means of the ends 24 of the key 21 the lock nut 8 is turned to place the spring 11 under the requisite tension, the nut 6, of course, being held against rotation. The nuts 6 and 8 are then engaged with a key 21 and it will be noted that the tension of the spring 11 will force the sides of the slots 18 into the depressions 23, thus preventing easy removal of the key, and the members 6, 8, 11 and 21 are then held as a single unit, by the engagement of the depressions 23 of the key with the sides of the slots 18. When in this condition the threads of the two nuts register to form a continuous thread.

When ready for use this unit is placed on the bolt where it is to be employed. A suitable cotter pin 17 is placed in position and then the key may be removed by application of a sufficient amount of force. I contemplate making the key of comparatively light, easily bent material so that if by chance the mechanic who applies the unit to the bolt neglects to remove the key, it will cause no injury to the crank casing even if it should come in contact therewith. By providing the main nut and lock nut in telescoping relation, and tensioning the spring therebetween, and providing the entire device as one unit, I make sure that proper tension will be applied to the spring without leaving that matter to the whim of the mechanic who places the device in position. Furthermore, the telescoping nuts require no more space than the standard hexagonal nut and the conical shaped spring will not expand when unwound a sufficient amount to come in contact with the crank casing. The spring is wound at the factory to make sure that it is completely wound, as well as to make it easier to install, especially on the No. 4 bearing on the Ford car, which is hard to get at. In all other devices known to me, the spring must be wound after the nut is turned to place.

By the use of my device, as described above, it is possible to employ a standard bolt 5 of full diameter throughout its length because the cone shaped nut 6 permits employment of a small and standard size hexagonal nut 8, while the telescoping relation of these nuts provides strength for the lock nut and prevents the torsion spring from ever coming in contact with the thread on the bolt. As the bearing wears the spring 11 will turn the nut 6 to take up the wear and I have found that as the nut on one side of the bearing loosens, the other tightens, thereby maintaining a constant pressure between the bearing and the crank shaft. Of course, it will be understood that the lock nut is held against rotation by the cotter pin 17 and any movement takes place in the nut 6, and by the provision of the quick thread this movement need be small in order to take up considerable wear. In case the spring 11 should break there is no possibility of its coming in contact with the thread on the bolt 5, and by the engagement of the conical surfaces on the nuts the parts will always be held in place without danger of coming loose. It will be noted that both the main nut and the lock nut are solid as distinguished from split nuts which are sometimes attempted to be used in similar devices and which are open to well known objections. The solid nut is not only easier and cheaper to make, but is far less likely to get out of order than is the split nut type.

I am aware that changes in the form, construction and arrangement of parts may be made without departing from the spirit and without sacrificing the advantages of the invention and I reserve the right to make all such changes as fairly fall within the scope of the following claims.

I claim:—

1. In a device of the character described, a main conical nut, a lock nut telescoping therewith, and means between said nuts and operatively connected therewith to tend to cause relative rotation therebetween.

2. In a device of the character described, a main conical nut, a lock nut telescoping therewith, and a torsion spring operatively connected with said nuts to tend to cause relative rotation therebetween.

3. In a device of the character described, a main conical nut, a lock nut telescoping therewith, and a conical torsion spring operatively connected with said nuts to tend to cause relative rotation therebetween.

4. In a device of the character described, a lock nut with a plurality of castellations, a bolt with a plurality of passageways therethrough, the number of said passageways being different from the number of said castellations, and locking means adapted to pass between said castellations and through one of said passageways, whereby adjustment of said lock nut is provided.

5. In a device of the character described, a conical main nut, a lock nut telescoping therewith and fitting the surface of said cone, a conical spring surrounding said nuts and under tension, and a key engaging said nuts to prevent relative rotation therebetween.

6. In a device of the character described, a conical main nut, a lock nut telescoping therewith and fitting the surface of said cone, a conical spring surrounding said nuts and under tension, and a key engaging said nuts to prevent relative rotation therebetween, said key being provided with means to detachably hold it in place on said nuts.

7. In a device of the character described, a main nut, a lock nut, and a key comprising a pair of legs engaging said nuts to hold them against relative rotation, each leg having a depression to engage a slot in one of said nuts to prevent removal therefrom and one end of said key being formed with a spanner to engage said lock nut.

8. In a device of the character described, a solid main nut, a lock nut telescoping therewith, said nuts having the same thread whereby they may be threaded upon a bolt having a single thread and also having conical contacting surfaces, and means uniting said nuts and holding them in operative position in respect to each other whereby the two nuts and said means may be handled as one unit and threaded upon a bolt in one operation.

STEPHEN A. SLAUSON.